Oct. 11, 1960

F. PREIS 2,955,396

PLANT PACKING MACHINE

Filed April 30, 1959

INVENTOR,
Fritz Preis,
BY Harrington A. Lackey
ATTORNEY

Oct. 11, 1960   F. PREIS   2,955,396
PLANT PACKING MACHINE
Filed April 30, 1959   6 Sheets-Sheet 6

INVENTOR,
Fritz Preis,
BY Harrington A. Lackey
ATTORNEY

United States Patent Office 2,955,396
Patented Oct. 11, 1960

2,955,396
PLANT PACKING MACHINE
Fritz Preis, 304 Ben Lomond Drive, McMinnville, Tenn.
Filed Apr. 30, 1959, Ser. No. 810,084
16 Claims. (Cl. 53—124)

This invention relates to a plant packing machine and more particularly to a machine to facilitate the packing of plants in individual containers.

Another object of this invention is to provide a plant packing machine which effectively compresses the packing material, such as soil, peat, humus, moss, shingletoe, or other appropriate damp material, about the roots of the plant, moves the compressed material and roots into a container, such as a bag or carton, held in open position and discharges the packaged plant from the machine.

Another object of this invention is to provide a machine which packs plants in individual containers with the least amount of time, effort and material.

A further object of this invention is to provide a plant packing machine which efficiently and rapidly compresses the packing material about the roots of the plant, and forces the roots and packing material into an open container without scarring the stock or the limbs and without damaging the foliage of the plants.

Another object of this invention is to provide a plant packing machine in which the packing material is compressed about the roots of the plant from both the top and the sides before being thrust into an open container, such as a bag or carton.

Another object of this invention is to provide a plant packing machine having a troughlike element for supporting the roots and packing material of the plant, the troughlike element having a side wall movable in unison with a cover member toward and away from the opposite side wall to selectively compress the packing material against the roots in closed position and to facilitate the reception of the next plant in the troughlike element in open position.

A further object of this invention is to provide a plant packing machine having a troughlike element for receiving the plant having side walls relatively movable toward and away from each other and a cover member movable toward and away from the top of said troughlike element, the bottom of the cover member being provided with a slidable ram-head adaptable to be advanced to thrust the compressed packing material and roots into an open container when the cover member closes the troughlike element.

Another object of this invention is to provide a plant packing machine having a novel type ram-head for thrusting the roots and packing material of a plant into a container without damaging the foliage.

Further objects and advantages of the invention will be apparent from the following description taken in conjunction with the drawings, wherein.

Referring now to the drawings in more detail, a supporting frame 14 comprising spaced longitudinal side beams such as angle irons 15 and 16 are maintained in a substantially horizontal plane by front legs 17, rear legs 18 and an intermediate leg 19.

A platform 20 having a flat sheet metal top 21 and down-turned side flanges 22 and 23 extends between the side beams 15 and 16 near the front end thereof so that the front flange 22 is substantially flush with the front ends of the beams 15 and 16.

Figures 1, 2:
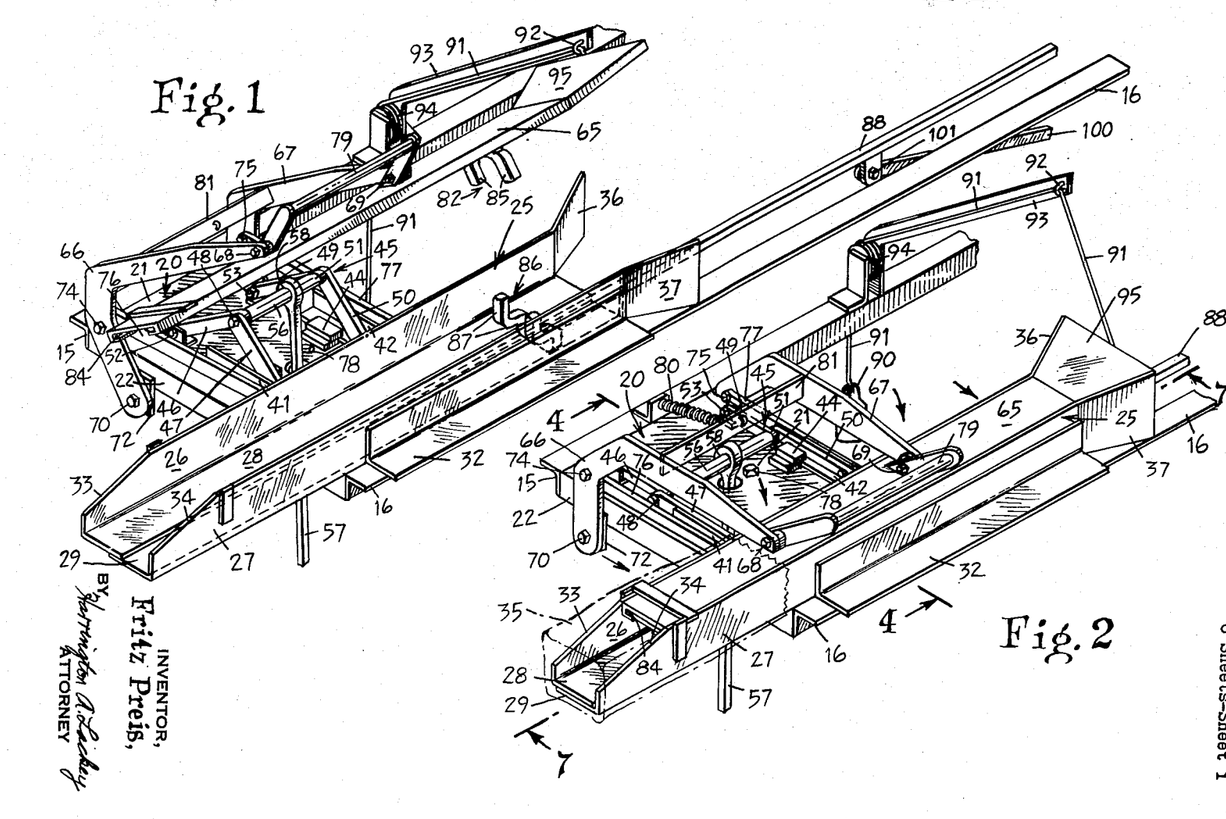
Fig. 1 is a perspective view of the invention in open position.
Fig. 2 is a perspective view of the invention in closed position with a container disclosed in phantom, in filling position.

Mounted on one side of the platform 20 is a troughlike element 25 extending substantially beyond the front end of the supporting frame 14. The troughlike element 25 preferably comprises a pair of opposed side walls 26 and 27 relatively movable toward and away from each other. A preferred form of the troughlike element 25 is disclosed in the drawings in which a pair of angle-shaped plates are so arranged that their bottom flanges 28 and 29 overlap in sliding engagement to form the bottom portion of the troughlike element 25, and their side flanges form, respectively, the spaced parallel side walls 26 and 27. The side wall 27 is preferably held stationary on the supporting frame 14 by means of a supporting angle frame 32 fixed to the beam 16. The side wall 26 is laterally movable so that it may be moved toward and away from the side wall 27 to vary the width of the cross section of the troughlike element 25. The forward ends of the side walls 26 and 27 are tapered, as indicated at 33 and 34 respectively, to facilitate their entry into the open end of a container 35 thrust over the forward end of the closed troughlike element 25, as indicated in Fig. 2 for the reception of the roots 141 of a plant 140 and packing material 142. The rear ends 36 and 37 of the side walls 26 and 27, respectively, may be flared outward as indicated in the drawings, or rounded smooth, to guide the extended limbs and foliage 143 of a plant with a minimum of damage as the plant 140 is advanced forward through the troughlike element 25.

Figures 5, 6:
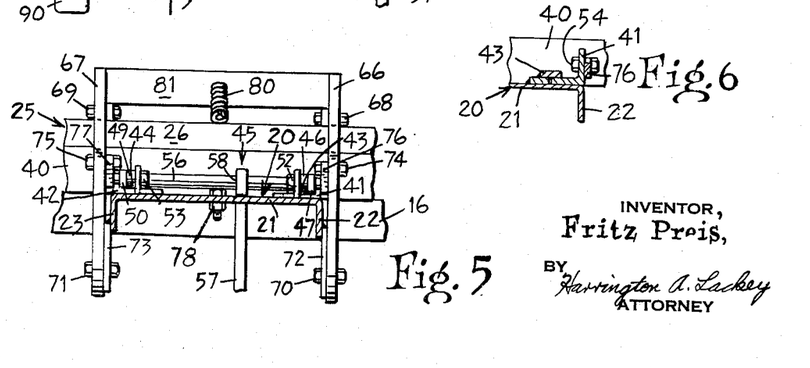
Fig. 5 is a section taken along the lines 5—5 of Fig. 4.
Fig. 6 is a partial section taken along the lines 6—6 of Fig. 3.
Figures 7, 8:
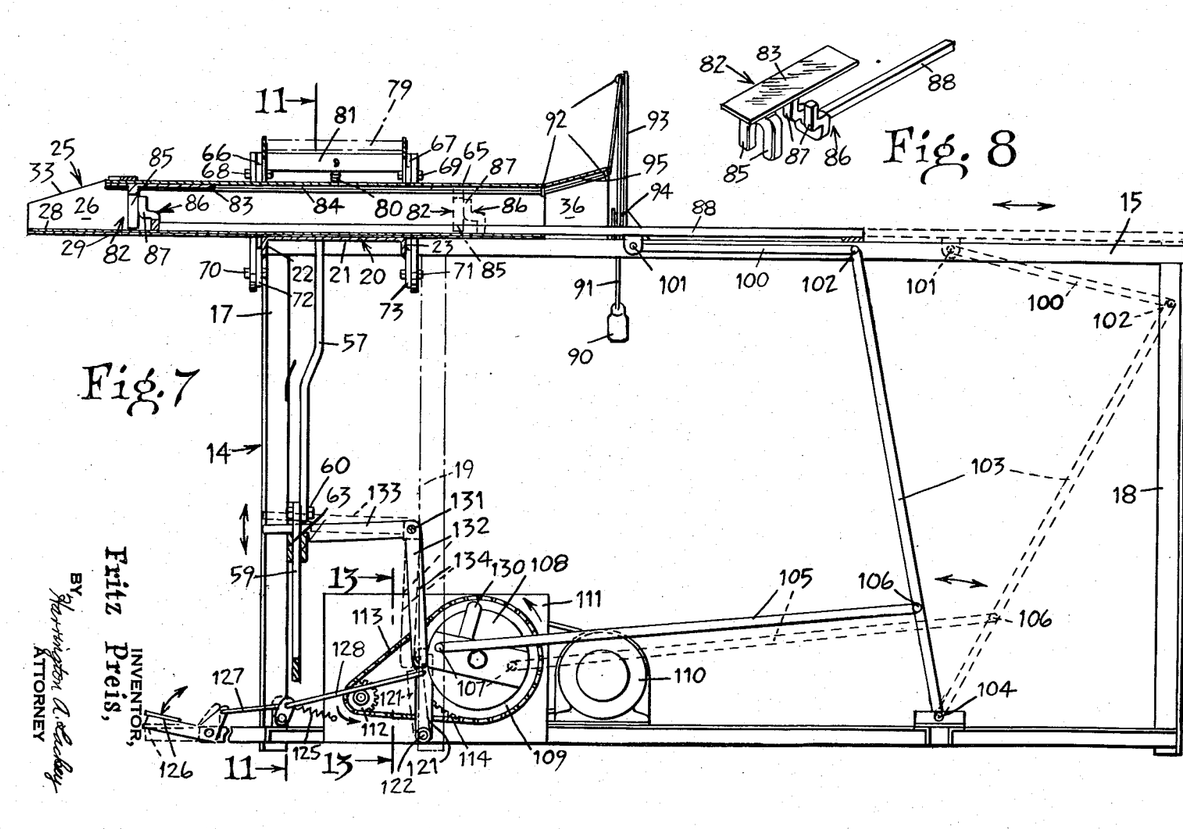
Fig. 7 is a view of the invention in closed position taken along the lines 7—7 of Fig. 2, including the supporting frame and operating mechanism.
Fig. 8 is a perspective view of the ram-head and the pushing element.

In order to move the side wall 26 laterally toward and away from its opposing side wall 27, a bar 40 is fixed to the outside of the wall 26 and is provided with a pair of slidable members such as the angles 41 and 42 which are fixed perpendicular to the bar 40 and are adapted to slide in the guideways 43 and 44 secured by welding or other means to the platform top 21, as best illustrated in Figs. 1, 2 and 6.

Slidable motion of the members 41 and 42 is effected by a toggle mechanism 45 comprising a pair of front links 46 and 47 pivoted to each other to form a hinged knee 48, and a pair of rear links 49 and 50 likewise pivoted to each other to form a hinged knee 51. The other ends of the links 46 and 49 are pivotally mounted to brackets on the platform top 21 by pins 52 and 53, respectively. The other ends of the links 47 and 50 are pivotally supported by pins 54 and 55, respectively, to the slidable members 41 and 42. A transverse hinge bar 56 is journalled in the hinged knees 48 and 51 and is actuated to pivot about the pins 52 and 53 through a link 57 having an eye 58 loosely surrounding the hinge bar 56. The bottom of the link 57 is pivotally connected to a foot pedal bar 59 by a pin 60. The foot pedal bar 59 is pivotally supported on the left front supporting leg 17 by a pin 61 and is angled to terminate at its other end in foot pedal 62. A guide 63 is mounted on right leg 17 to restrain the pedal bar 59 to vertical reciprocatory movement.

A cover member 65 comprising a substantially rectangular plate is adapted to be moved toward and away from the troughlike element 25 in order to close the open top of the troughlike element when the side wall 26 has been moved to its extreme position nearest the opposing side wall 27, by the toggle mechanism 45. The width of the cover member 65 is substantially equal to the narrowest width of the troughlike element 25 in closed position. In order to move the cover member 65 toward and away from the open top of the troughlike element 25, one end of each of a pair of angularly shaped arms 66 and 67 are connected in any convenient manner, such as by bolts 68 and 69, respectively, to the top of the cover member 65. The other ends of the arms 66 and 67 are pivoted by the pins 70 and 71, respectively, to ears 72 and 73 depending from the respective flanges 22 and 23 of the platform 20.

In order that the cover member 65 may be moved toward the position of closing the troughlike element 25 simultaneously as the side wall 26 is moved toward the opposite wall 27 to contract the width of the troughlike element 25, and in order that the cover member 65 may be moved away from the troughlike element 25 to open position as the side wall 26 is withdrawn away from the side wall 27 in order to expand the effective width of the troughlike element 25, the intermediate portions of the arms 66 and 67 are connected, respectively, by pins 74 and 75 to links 76 and 77, the other ends of which are hinged, respectively, by the pivot pins 54 and 55 to the slidable members 41 and 42. Thus, when the toggle mechanism 45 is actuated by the foot pedal 62, to contract the side walls 26 and 27, the sliding motion of the members 41 and 42 toward the right of the supporting frame 14, as viewed in Figs. 4 and 5, will cause the cover member 65 to move downward to closed position by virtue of the connecting links 76 and 77.

Figures 3, 4:
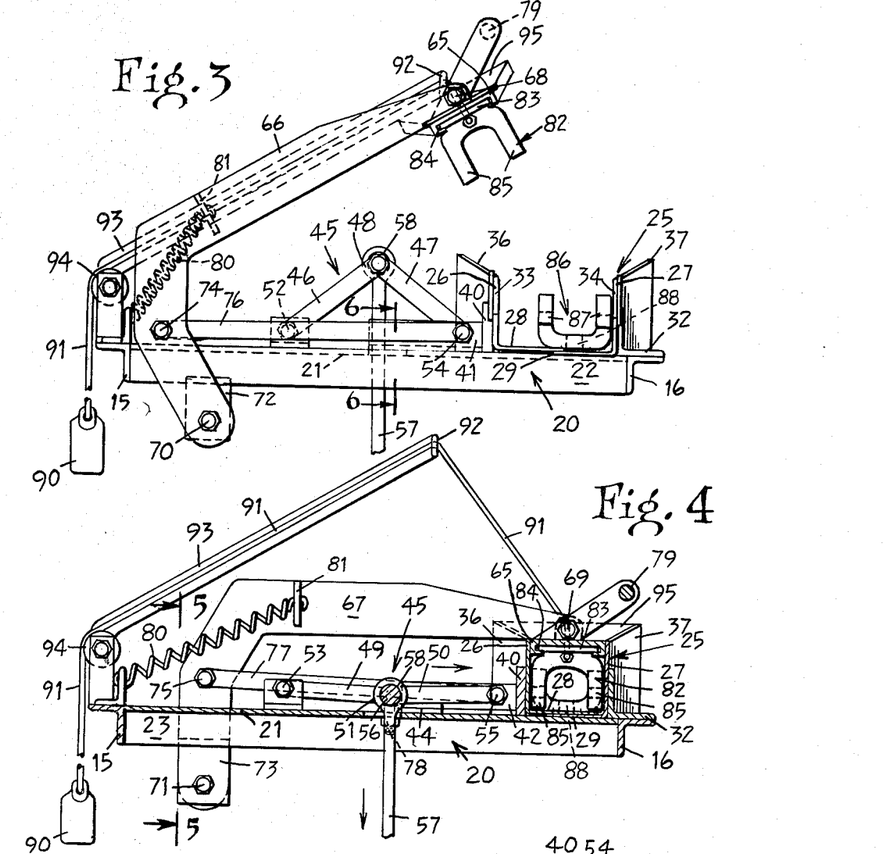
Fig. 3 is a front end elevation of the invention in open position.
Fig. 4 is a section taken along the lines 4—4 of Fig. 2.
Figure 11:
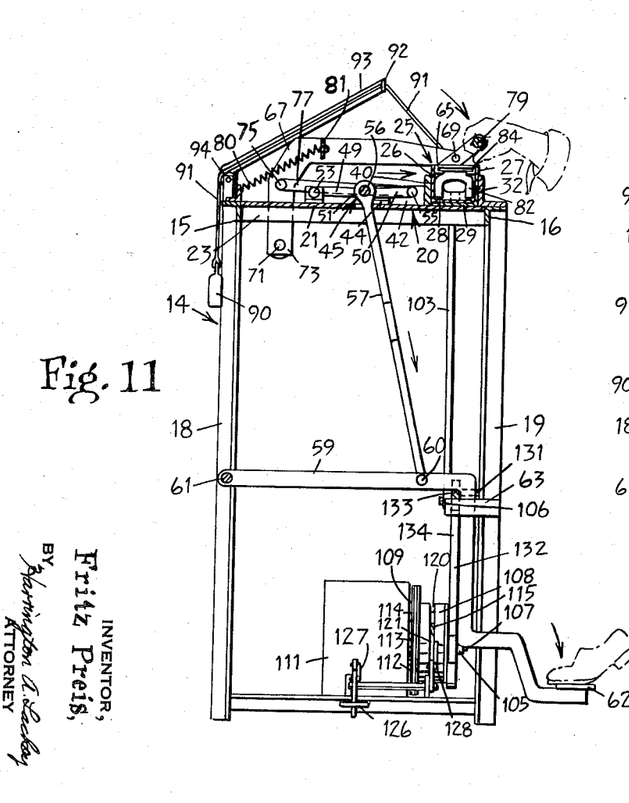
Fig. 11 is a section taken along the lines 11—11 of Fig. 7.
Figure 12:
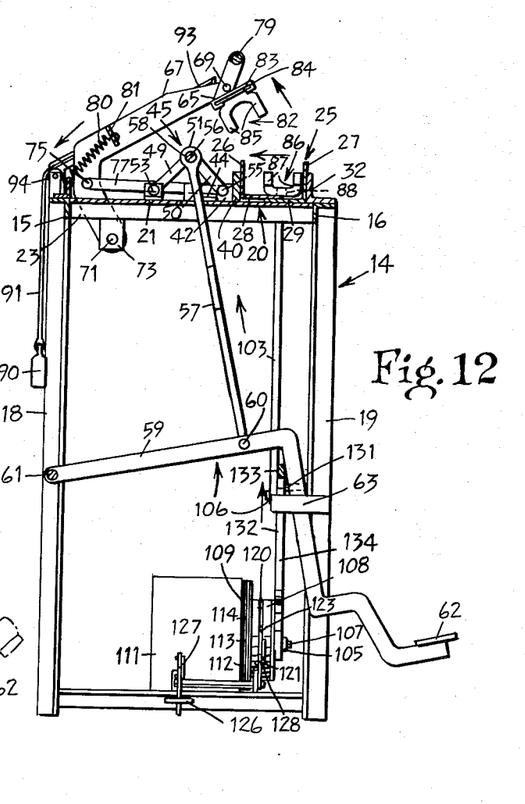
Fig. 12 is a view similar to Fig. 11 with the invention in open position.
Figure 13:
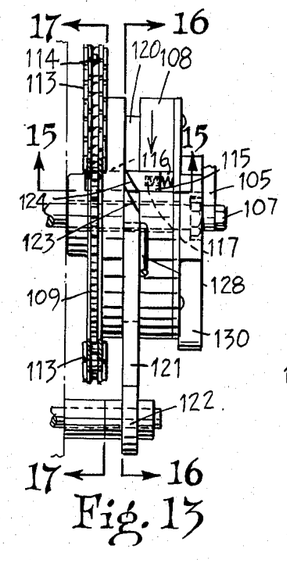
Fig. 13 is a section taken along the lines 13—13 of Fig. 7, disclosing the clutch mechanism engaged and rotated to the dashed line position.
Figure 14:
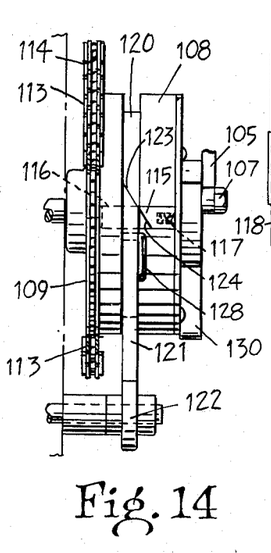
Fig. 14 is a view similar to Fig. 13 disclosing the clutch mechanism disengaged.
Figure 15:
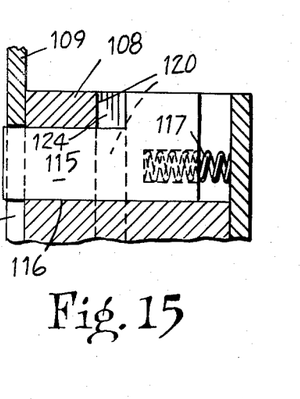
Fig. 15 is a section taken along the lines 15—15 of Fig. 13.

The toggle mechanism 45 is so designed that when the cover member 65 is in closed position, the hinge bar 56 lies below the plane of the pivot pins 52, 53, 54 and 55, and abuts against the stop nut 78, as best disclosed in Figs. 4, 5 and 11. In other words, the hinge bar 56 and the knees 48 and 51 are pivoted below dead center of the links 46 and 47, and 49 and 50, respectively, in order to lock the movable side wall 26 and the cover member 65 in closed position. In order to manually unlock the toggle mechanism and open the troughlike element 25, a handle 79 is fixed on top of the cover member 65 to raise the cover member until the hinge bar 56 is lifted above dead center at which point a coiled spring 80 connecting the side beam 15 to a cross brace 81 between the arms 66 and 67 will retract the cover member 65 to the raised position disclosed in Figs. 1, 3 and 12. A mechanism for automatically unlocking the toggle mechanism 45 will be later described.

In order that a plant 140 may be advanced through the troughlike element 25 when the cover member 65 is in closed position, a ram-head 82, having a width equal substantially to the narrowest width of the troughlike element 25 when the side walls 26 and 27 are in closed or compressed position, is slidably mounted on and beneath the cover member 65. A preferred method of effecting the sliding movement of the ram-head 82 is to provide a top plate 83 on the ram-head, the edges of which are adapted to slide in the guideways 84 formed by turning the edges of the cover member 65 downward and inward to receive the edges of the plate 83. The ram-head 82 preferably has an inverted U-shape with depending legs 85 extending downward along the sides of the troughlike element 25, when the cover member 65 is closed, to straddle the trunk of the plant 140 placed within the troughlike element 25 and engage and thrust forward the plant roots 141 and packing material 142.

In order to advance the ram-head 82 forward through the troughlike element 25, when the cover member 65 is closed, a ram pushing element 86, which is bifurcated into a pair of like laterally spaced legs 87 adapted to engage the legs 85 of the ram-head 82, is fixed to the end of a push rod 88, operative to reciprocate the pushing element 86 longitudinally through the troughlike element 25. Since the sole function of the pushing element 86 is to move the ram-head 82, the legs 87 may engage the rear edge of the ram plate 83 if desired, instead of the respective rear sides of the legs 85.

As best disclosed in Figs. 1, 2, 9 and 10, a relatively light weight 90 is connected to the rear of the ram plate 83 by means of a cable 91 guided through eyes 92 mounted on the cover member 65 and an arm 93 supported on the side beam 15 and extending above the cover member. The cable 91 is also guided over a pulley 94 mounted on the beam 15 to freely suspend the weight 90. The value of the weight 90 is such that when the cover member 65 is raised, the weight will cause the ram-head 82 to slide toward its extreme rear position disposed in Fig. 9. When the cover member 65 is closed, the ram-head 82 will also be retracted to its extreme rear position unless held in a forward position by the pushing element 86 or the plant branches 143. Thus, even when the pushing element 86 is reciprocating toward the rear with cover member 65 closed, the ram-head 82 will not slide back over the branches 143 until the cover member is raised. Consequently, the tendency to scar the branches and damage the foliage by a retractible ram-head is eliminated.

The weight 90 and cable 91 may be relaced by any other type retractible means for withdrawing the ram-head 82, such as a coiled spring, if desired.

The rear portion of the cover member 65 may be flared at 95, similar to the wall extensions 36 and 37, or rounded, if desired, to guide the limbs and foliage 143 of a plant 140 as it is being advanced through the troughlike element 25, when the cover member 65 is in closed position.

The mechanism for reciprocating the push rod 88 includes a link 100, one end of which is pivotally connected by a pin 101 to the push rod 88, and the other end of which is hinged by a pin 102 to the free end of another link 103 pivotally supported at its opposite end 104 to the frame 14. The link 103 is reciprocated in a limited arc about its pivoted end 104 by means of a crank arm 105 journaled at one end to the link 103 by the pin 106 and eccentrically journaled at its opposite end 107 to a driven rotary clutch disc 108. The driven clutch disc 108 is rotated by engagement with a driving clutch disc 109, which in turn is driven by a motor 110 through a gear-reduction box 111, a sprocket 112, a chain 113 and a sprocket 114 fixed to the clutch disc 109.

As best disclosed in Figs. 7 and 13–17, the driven clutch disc 108 is provided with a locking pin 115 laterally slidable in a slot 116 in the disc 108 and biased by a spring 117 toward the clutch disc 109. When rotation of the clutch disc 109 causes the slot 118 formed in the disc 109 to register with the free end of the pin 115, the pin 115 will be urged into the slot 118 to lock the discs 108 and 109 together, causing the push rod 88 to reciprocate.

In order to disengage the driven clutch disc 108 from the driving clutch disc 109, a circumferential groove 120 is formed on the periphery of the disc 108 intersecting the transverse slot 116 as disclosed in Figs. 13–16. Adapted to selectively ride in the groove 120 is a bar 121 pivoted to the frame 14 at 122, the end of which forms a cam surface 123 adapted to periodically engage a mating cam surface on a lug 124 projecting radially from the locking pin 115 as the lug is moved into the path of the bar 121 by the rotation of the disc 108. After the cammed surfaces 123 and 124 engage, the continued rotation of the disc 108 will cause the lug 124 and pin 115 to move in the slot 116 away from and disengage the slot 118 in the driving disc 109. Consequently, although the disc 109 will continue to rotate as long as the motor 110 continues to run, the driven disengaged disc 108 will stop rotating and will remain inoperative as long as the bar 121 remains in the groove 120. Although the bar 121 is biased toward the groove 120 by the spring 125, the bar 121 may be pivoted away from the groove by pressing downward on the pedal 126 which operates the bar 121 through the connecting links 127 and 128.

Figure 16:
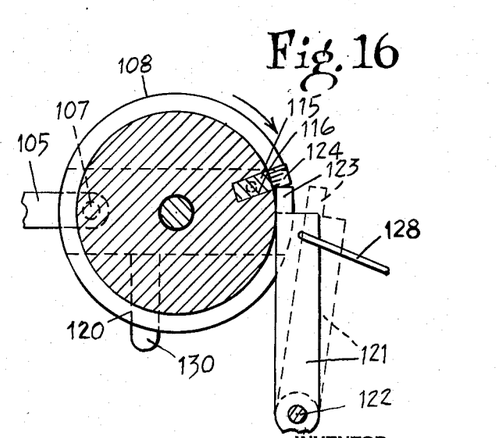
Fig. 16 is a section taken along the lines 16—16 of Fig. 13.
Figure 17:
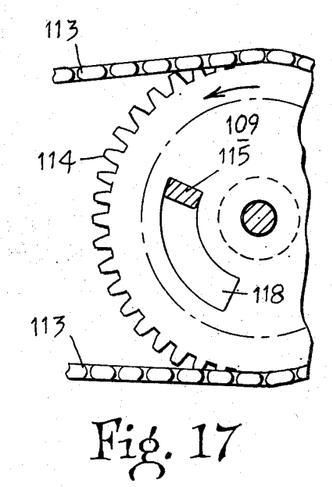
Fig. 17 is a section taken along the lines 17—17 of Fig. 13.

As best disclosed in Fig. 16, the journal 107 is almost diametrically opposed to the locking pin 115 in order that the clutch discs 108 and 109 will engage and disengage to initiate and terminate the reciprocation of the push rod 88 at its extreme rearward position. Such intermittent cyclical operation permits refilling the open troughlike element 25 with a plant 140 and packing material 142 at the will of the operator.

As previously mentioned, the cover member 65 may be automatically raised at a predetermined time, preferably shortly after the pushing element 86 has begun its rearward movement after the container 35 has been filled. The mechanism for accomplishing this movement includes a trip arm 130 projecting from the periphery of the clutch disc 108 behind the journal 107. Pivotally mounted on the intermediate leg 19 at 131 is a bellcrank lever 132 having one arm 133 extending laterally beneath a portion of the foot pedal bar 59 and the other arm 134 depending in the path of the rotating trip arm 130. Thus, when the clutch discs 108 and 109 are engaged, the trip arm 130 will engage the depending arm 134 at a predetermined time to pivot the bellcrank lever 132 and cause the arm 133 to raise the pedal bar 59 sufficiently to elevate the toggle mechanism 45 above dead center to raise the cover member 65 to open position.

The operation of the machine is as follows:
With the machine in open position as disclosed in Figs. 1 and 3, the cover member 65 is raised and side wall 26 is withdrawn to effect a maximum width for the troughlike element 25. A plant 140 having roots 141 and a stock, limbs and foliage 143 are placed in the trough like element 25 in the position disclosed in Fig. 9. With the branches and foliage 143 extending from the rear of the troughlike element, and in such a manner that the ram-head 82 and the pushing element 86 in their rearmost position disclosed in Figs. 1, 7 (dashed lines) and 9 are completely behind the roots 141. Packing material 142, such as peat, moss, humus or shingle-toe, is poured into the troughlike element 25 to completely surround the roots 141.

Figures 9, 10:
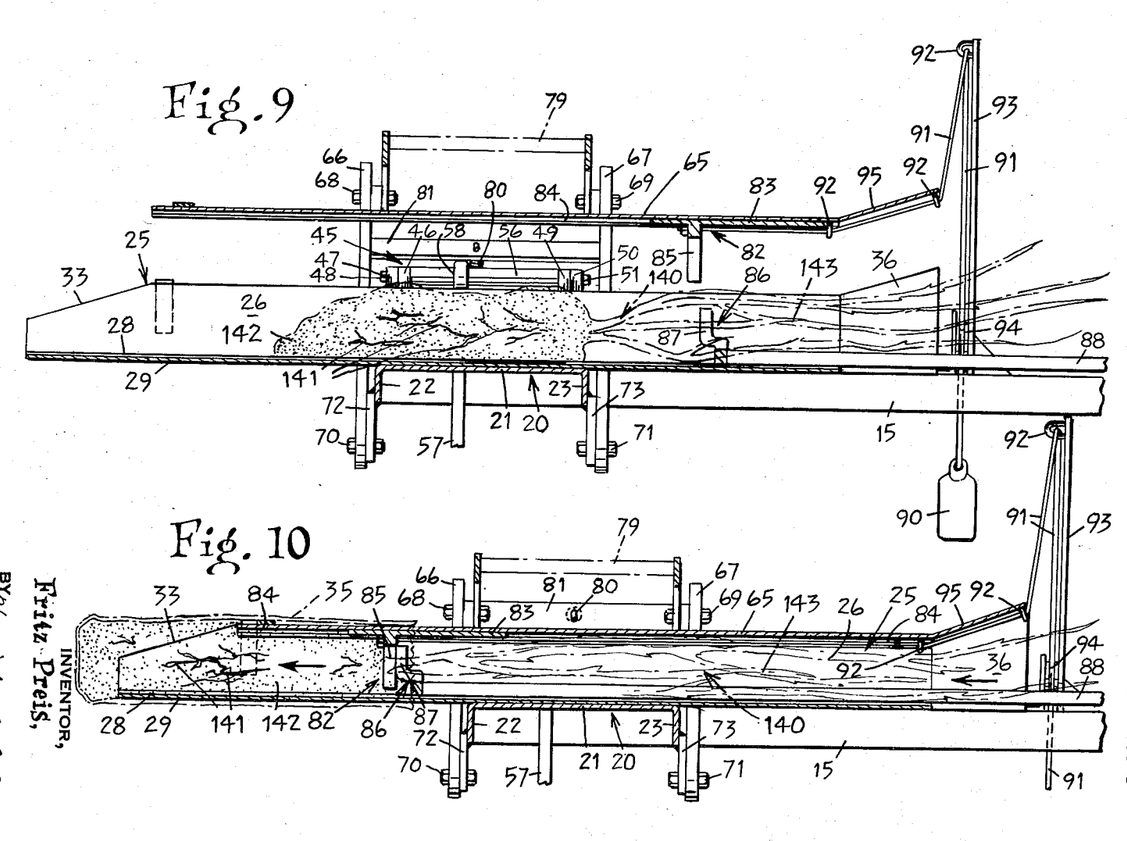
Fig. 9 is a view taken along the lines 7—7 of Fig. 2 receiving a plant in its initial position and with the cover member in an intermediate operative position.
Fig. 10 is a view similar to Fig. 9 with the troughlike element and cover member in closed position and the ram-head in an intermediate advanced position.

The foot pedal 62 or the handle 79 is then depressed to extend the toggle mechanism 45 and urge the side wall 26 and the cover member 65 to closed position. During this closing operation, the packing material 142 is compressed by the side wall 26 against the roots 141. As the cover member 65 draws closer to the open top of the troughlike element 25, as disclosed in Fig. 9, the cover member will engage and then compress the packing material 142 about the roots 141 from the top. When the troughlike element 25 is completely closed, as best disclosed in Figs. 2, 4, 7 and 11, the packing material 142 will have been thoroughly compressed about the roots 141 from both the top and the side. The container 35, such as a cardboard container or paper bag, is then slipped over the forward end of the troughlike element 25 and the forward portion of the cover member 65. The motor 110 is started to continuously rotate the driving clutch disc 109. As long as the pedal 126 is not depressed, the spring 125 biases the bar 121 into the circumferential groove 120 to prevent the locking pin 115 from entering the slot 118 thereby disengaging the clutch discs 108 and 109 to maintain the pushing element 86 inoperative, in its rear position as disclosed by the dashed lines in Fig. 7. With the container 35 properly fitted over the closed troughlike element 25 and cover member 65 as disclosed in Fig. 2, the pedal 126 is depressed to the dashed line position of Fig. 7 to withdraw the bar 121 to permit the clutch discs 108 and 109 to engage, thereby causing the driven clutch disc 108 to rotate and reciprocate the push rod 88 through the links 100, 103 and crank arm 105 for one complete cycle. For each revolution of the driven clutch disc 108, the pushing element 86 will move from its extreme rear position to its extreme forward position and return to its original position. When the cover member 65 is closed, the pushing element 86 in its rearmost position will engage the ram-head 82 and advance it forward carrying with it through the troughlike element 25 the roots 141 and the packing material 142 into the container 35. The trunk, branches and foliage 143 are guided into the troughlike element 25 by the flared members 36, 37 and 95. Fig. 10 discloses the ram-head 82 advancing through the closed troughlike element 25 and in a position in which the container 35 is completely filled with the roots 141 and the packing material 142 and the filled container 35 is just beginning to be thrust from the forward portion of the troughlike element 25. After the ram-head 82 has reached its extreme advanced position as disclosed by the solid lines in Fig. 7, the filled sack 35 is withdrawn from the troughlike element 25 by the operator. After the open end of the sack 35 has cleared the forward end of the cover member 65, the cover member may be positively raised to its open position by raising foot pedal 62 or by automatically elevating the toggle operating link 57 through the trip arm 130 and bellcrank lever 132, as previously described. The ram-head 82 is automatically withdrawn to its original extreme rear position by means of the weight 90 acting through the cable 91, after the cover member 65 is raised and the ram-head 82 has cleared the branches and foliage 143. The continued rotation of the driven clutch disc 108 will cause the pushing element 86 to reciprocate toward its extreme rear position. The movement of the pushing element 86 and the operating push rod 88 may be continued indefinitely by continuously depressing the foot pedal 126 to maintain the bar 121 out of the groove 120.

The specific embodiment of the invention disclosed in the drawings is designed for the efficient operation by two men in the compressing of packing material about the roots of a plant, such as a tree or shrub, and packaging the plant in an open container. Experience in the operation of a machine made in accordance with this invention has revealed a continuous production of six or seven packaged plants per minute, with little training required on the part of the operators.

It will be apparent to those skilled in the art that various changes may be made in the invention, without departing from the spirit and scope thereof, and therefore the invention is not limited by that which is shown in the drawings and described in the specification but only as indicated in the appended claims.

What is claimed is:

1. A plant packing machine comprising a troughlike element having an open top and opposing side walls relatively movable toward and away from each other, a cover member movable toward and away from said troughlike element to close said troughlike element when said side walls have been moved toward each other a predetermined distance, means for simultaneously moving one of said side walls toward the other and said cover member toward the top of said troughlike element to a closed position and for simultaneously moving said one side wall away from the other and said cover member away from the top of said troughlike element to an open position, a ram-head carried by and beneath said cover member for slidable longitudinal movement thereof, and means for advancing said ram-head from a position near the rear of said troughlike element when said cover member is in closed position to a position near the front of said troughlike element, and means for retracting said ram-head to its rear position when said cover member is moved away from the top of said troughlike element.

2. A plant packing machine comprising a frame, a troughlike element having an open top and opposing side walls mounted on said frame, one of said walls being movable toward and away from the opposite wall, a cover member adapted to close the top of said troughlike element, an arm pivoted to said frame and supporting said cover member for swinging movement to close and open the top of said troughlike element, a link pivotally connecting said arm and said movable side wall in such a manner as to permit simultaneous movement of said cover member and said movable side wall toward or away from said troughlike element, means for simultaneously moving said cover member and said movable wall towards said troughlike element to compress packing material about the roots of a plant placed therein, a ram-head carried by said cover member and longitudinally movable through said troughlike element when said cover member is closed to engage and thrust said packing material and roots through said troughlike element, and means for moving said ram-head.

3. The invention according to claim 2 in which the means for simultaneously moving said cover member and said movable wall comprises a pair of hinged toggle links, one link being pivoted to said frame and the other link being pivoted to said movable wall.

4. The invention according to claim 3 in which means are provided to move said toggle links beyond dead center in order to lock the cover member and movable wall in closed position in said troughlike element.

5. The invention according to claim 4 in which means are provided for automatically contracting said toggle links beyond dead center to unlock and move said movable side wall and said cover member to open position, said unlocking means being synchronized with said ram-head moving means for periodically unlocking said toggle links at a predetermined time.

6. The invention according to claim 2 in which the means for moving said ram-head comprises a push rod adapted to reciprocate longitudinally of said troughlike element, a driving clutch disc and a driven clutch disc adapted to be selectively engaged for continuous rotation together, a crank arm eccentrically journaled to said driven clutch disc and linked to said push rod for reciprocating said push rod as long as said driven disc engages said driving disc, and means for selectively disengaging said driven disc from said driving disc in order to terminate the reciprocation of said push rod at a predetermined position.

7. The invention according to claim 6 in which the means for moving said cover member and said movable side wall comprise a pair of hinged toggle links, one link being pivotally mounted to said frame and the other link being pivotally connected to said movable wall, an operating link connected to said toggle links operative to contract said toggle links to withdraw said movable side wall from said opposite wall to open said troughlike element and to extend said toggle links through dead center to move said movable side wall toward said opposite side wall to lock said side walls and cover member in closed position in said troughlike element.

8. The invention according to claim 7 in which a bellcrank lever is pivoted to said frame and a trip arm projects radially from said driven clutch disc, the first arm of said bellcrank lever being disposed in the path of said trip arm and adapted to be pivoted by said trip arm when said driven disc engages said driving disc, the second arm of said bellcrank lever being adapted to operatively move said toggle operating link to contract said toggle links when said trip arm engages said first arm of said bellcrank lever to automatically unlock and open the movable side wall and cover member of said troughlike element.

9. A plant packing machine comprising a troughlike element for receiving packing material and the roots of a plant having a stock extending toward the rear of said troughlike element, said troughlike element having an open top and opposing walls, one of said walls being slidable toward and away from said other wall, a cover member movable toward and away from the top of said troughlike element and adapted to close the top of said troughlike element when the movable side of said troughlike element has moved toward said opposite side a predetermined distance, means for simultaneously moving said cover member towards the top of said troughlike element and said movable side towards said opposite side to compress said packing material against said roots, the forward portion of said troughlike element and cover member in closed position being adapted to receive a container thereover, a ram-head carried by and beneath said cover member to slide longitudinally thereof, said ram-head being substantially the full width of said troughlike element in closed position and being adapted to straddle said stock and to push said roots and packing material through said troughlike element and into said container, a reciprocable pushing element adapted to engage and advance said ram-head forward through said troughlike element when said cover member is closed, means for reciprocating said pushing element, and retractible means for returning said ram-head to its original rear position when said cover member is moved away from said troughlike element.

10. The invention according to claim 9 in which the walls of said troughlike element comprise substantially L-shaped sections having overlapping slidable bottom sections.

11. The invention according to claim 9 in which the means for moving said movable side wall comprises a toggle mechanism and the means for moving said cover member toward and away from the top of said troughlike element comprises a pivoted arm supporting said cover member, a link pivoted at one end to an intermediate portion of said arm and at the other end to said movable side wall, and means for actuating said toggle mechanism to selectively move said movable side wall and said cover member toward said troughlike element to closed position and to move said movable side wall and cover member away from said troughlike element to an open position.

12. The invention according to claim 11 in which means are provided to move the knee of the toggle mechanism beyond the dead center of said extended position to lock said movable side wall and said cover member in closed position.

13. The invention according to claim 9 in which clutch means are provided for periodically reciprocating said pushing element from an extreme rear position to an extreme forward position and return and for periodically dwelling between each complete reciprocation.

14. A machine for packaging the roots of a plant having an extending stock comprising, a troughlike element having an open top for receiving said plant, an elongated cover member adapted to close the top of said troughlike element, means for moving said cover member towards and away from said troughlike element to respectively close and open the top of said troughlike element, a ram-head carried by and beneath said cover member for longitudinal slidable movement thereof, said ram-head being adapted to straddle said stock and to engage said roots for advancing said roots longitudinally through said troughlike element when said cover member is closed, means for driving said ram-head to advance said roots only when said cover member is closed, and retractible means independent of said driving means for slidably withdrawing said ram-head along said cover member when said cover member is moved away from said troughlike element.

15. The invention according to claim 14 in which said ram-head comprises an inverted U-shaped member having depending legs adapted to straddle the stock of said plant.

16. The invention according to claim 14 in which the value of said retractible means is such as to prevent any withdrawal of said ram-head along said cover member as long as said ram-head engages substantially any portion of said extending stock.

References Cited in the file of this patent

UNITED STATES PATENTS

| | | |
|---|---|---|
| 715,340 | Belot | Dec. 9, 1902 |
| 2,393,102 | Gribner | Jan. 15, 1946 |
| 2,500,819 | Hall et al. | Mar. 14, 1950 |
| 2,847,808 | Romine | Aug. 19, 1958 |